(12) United States Patent
Lee et al.

(10) Patent No.: US 6,169,536 B1
(45) Date of Patent: *Jan. 2, 2001

(54) COLOR PICTURE QUALITY COMPENSATION CIRCUIT AND RELATED CONTROL METHOD THEREOF

(75) Inventors: Kwang-Chun Lee, Kyungsangbook-Do; Yeong-Ho Ha, Daeku; Kyong-Chul Hong, Kyungsangbook-do, all of (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/847,602

(22) Filed: Apr. 25, 1997

(30) Foreign Application Priority Data

Jun. 4, 1996 (KR) .................................. 96-19821

(51) Int. Cl.[7] ................................ G09G 5/02; H04N 9/64
(52) U.S. Cl. ........................................... 345/150; 348/652
(58) Field of Search .................... 348/652, 649, 348/651, 653, 654; 345/150, 151, 207; 368/1–10

(56) References Cited

U.S. PATENT DOCUMENTS

| | | | |
|---|---|---|---|
| 3,749,825 | * 7/1973 | Moore | 348/652 |
| 4,296,432 | * 10/1981 | Engel et al. | 348/652 |
| 4,327,374 | * 4/1982 | Matsuda et al. | 348/653 |
| 4,385,311 | * 5/1983 | Harwood et al. | 348/653 |
| 4,987,482 | * 1/1991 | Imai et al. | 348/652 |
| 5,305,094 | 4/1994 | Belmares-Sarabis et al. | 348/651 |
| 5,381,185 | * 1/1995 | Ohki et al. | 348/649 |
| 5,384,601 | * 1/1995 | Yamashita et al. | 348/652 |
| 5,502,508 | * 3/1996 | Kawabata et al. | 348/652 |
| 5,585,680 | * 12/1996 | Takeshima | 348/652 |
| 5,585,860 | 12/1996 | Takeshima . | |
| 5,677,741 | * 10/1997 | Yui | 348/649 |
| 5,841,421 | * 11/1998 | Cheetam et al. | 345/150 |

FOREIGN PATENT DOCUMENTS 0 160 489    11/1985    (EP) .
0 677 971 A2  10/1995    (EP) .

OTHER PUBLICATIONS

Y. Yoshio, "Skin Color Correcting Circuit" Patent Abstracts of Japan, of JP 04 267 691, vol. 17, No. 61 (1993).
O. Hiroshi, "Image Pickup Device" Patent Abstracts of Japan, of JP 04 150,690, vol. 16, No. 432, (1992).
T. Hideo, "Picture Processor" Patent Abstracts of Japan, of JP 62–229–478, vol. 12 No. 097 (1987).

* cited by examiner

Primary Examiner—Matthew Luu
Assistant Examiner—Anthony J. Blackman
(74) Attorney, Agent, or Firm—Finnegan, Henderson, Farabow, Garrett & Dunner, L.L.P.

(57) ABSTRACT

A color picture quality compensation circuit comprising a device for detecting whether a reference color signal is present in a color signal representing a color of a video image; a device for determining a respective one of a plurality of types of reference color corresponding to a detected reference color signal; a device for providing preset compensation values, each value corresponding to a respective one of said plurality of types of reference color; and a device for adjusting the picture quality of the video image in accordance with one of said compensation values corresponding to said respective type of reference color.

14 Claims, 10 Drawing Sheets

| COLOR | PHASE ANGLE(∅) | PHASE DETECTOR OUTPUT VOLTAGE |
|---|---|---|
| WHITE | | 4.2 |
| MAGENTA | 61° | 3.8 |
| RED | 104° | 3.5 |
| YELLOW | 167° | 2.6 |
| GREEN | 241° | 1.7 |
| CYAN | 284° | 1.3 |
| BLUE | 347° | 0.5 |
| SKIN COLOR | 116°~130° | 2.95~3.25 |

FIG. 11

| AD1 | AD2 | AD3 | AD4 | SKIN COLOR TYPE |
|---|---|---|---|---|
| 0 | 0 | 0 | 0 | YELLOW<br>$X<2.95$ |
| 1 | 0 | 0 | 0 | MONGOLIAN<br>$2.95<X<3.05$ |
| 1 | 1 | 0 | 0 | NEGRO<br>MAKE UP, SUN-TANNED<br>$3.05 \leq X<3.15$ |
| 1 | 1 | 1 | 0 | CAUCASIAN<br>$3.15<X<3.25$ |
| 1 | 1 | 1 | 1 | RED<br>$X>3.25$ |

FIG. 13A

MONGOLIAN SKIN COLOR

| X | Y | U' | V' |
|---|---|---|---|
| 0.4258 | 0.3781 | 0.2548 | 0.5090 |
| 0.4716 | 0.4055 | 0.2725 | 0.5272 |
| 0.4492 | 0.3838 | 0.2579 | 0.5150 |
| 0.4624 | 0.3976 | 0.2702 | 0.5227 |
| 0.4234 | 0.3588 | 0.2623 | 0.5000 |
| 0.4652 | 0.3794 | 0.2810 | 0.5156 |
| 0.5454 | 0.4255 | 0.3310 | 0.5459 |
| 0.5375 | 0.4284 | 0.3043 | 0.5457 |
| 0.4821 | 0.4062 | 0.2791 | 0.5290 |
| 0.4762 | 0.3985 | 0.2789 | 0.5252 |

FIG. 13B

CAUCASIAN SKIN COLOR

| X | Y | U' | V' |
|---|---|---|---|
| 0.4735 | 0.3803 | 0.2853 | 0.5173 |
| 0.4607 | 0.3843 | 0.2754 | 0.5170 |
| 0.4526 | 0.3835 | 0.2703 | 0.5154 |
| 0.4579 | 0.3869 | 0.2723 | 0.5176 |
| 0.4461 | 0.3801 | 0.2633 | 0.5167 |
| 0.4705 | 0.3936 | 0.2755 | 0.5223 |
| 0.4849 | 0.3847 | 0.2918 | 0.5209 |
| 0.4869 | 0.4044 | 0.2831 | 0.5291 |
| 0.4344 | 0.3905 | 0.2548 | 0.5156 |
| 0.4407 | 0.3925 | 0.2582 | 0.5173 |

FIG. 13C

NEGRO SUN-TANNED OR MAKE-UP SKIN COLOR

| X | Y | U' | V' |
|---|---|---|---|
| 0.4358 | 0.3988 | 0.2612 | 0.5220 |
| 0.4416 | 0.4215 | 0.2745 | 0.5232 |
| 0.4592 | 0.3949 | 0.2779 | 0.5127 |
| 0.4624 | 0.4076 | 0.2802 | 0.5332 |
| 0.4434 | 0.3781 | 0.2623 | 0.5201 |
| 0.4432 | 0.3814 | 0.2963 | 0.5164 |
| 0.5854 | 0.42157 | 0.3281 | 0.5559 |
| 0.5076 | 0.4298 | 0.3367 | 0.5577 |
| 0.4521 | 0.4253 | 0.3213 | 0.5390 |
| 0.4862 | 0.4185 | 0.3278 | 0.5412 |

COLOR PICTURE QUALITY COMPENSATION CIRCUIT AND RELATED CONTROL METHOD THEREOF

BACKGROUND OF THE INVENTION

1. Field of the Invention

The present invention relates to a color picture quality compensation circuit, and in particular to an improved color compensation circuit in which is a color picture quality is compensated for in reference to a reference color selected by a user.

2. Description of the Conventional Art

Since skin color is most easily retained in human memory, color picture display systems such as television receivers and computer monitors, there have been several approaches for adjusting color picture quality using skin color as a reference color. Referring to FIG. 1, one approach is to gather colors within peripheral portions of a "skin color axis" which is positioned at a 123° with respect to the B-Y demodulation axis.

More specifically, in order to produce various skin colors as a reference skin color, the phase of the R-Y demodulation axis is increased to move the R-Y axis toward the skin color axis and the phase of the green color (G-Y axis: not shown) is decreased to move its axis toward the skin color axis whereby the phase of the skin color is within the peripheral portions of the skin color axis.

Yet more specifically, referring to FIG. 2, in order to gather a color vector V1, which has a positive phase angle with respect to the skin color axis, a R-Y component $V_{R-Y}$ of the $V_1$ is decreased to $V_{R-Y'}$. Because of this decrease, the $V_1$ now becomes a color vector $V_{1'}$, which has a phase closer to the skin color axis, thus producing the color as a reference skin color. Likewise, when a B-Y component $V_{B-Y}$ of a color vector $V_2$, which has a negative phase angle with respect to the skin color axis, is decreased to a value $V_{B-Y'}$, the color vector $V_2$ becomes a color vector of $V_{2'}$, which has a phase within the peripheral portions of the skin color axis, thus producing the color as a reference skin color.

An example of such a conventional skin color compensation circuit is shown in FIG. 3. This conventional compensation circuit includes a burst gate 1 for providing a burst signal derived from a composite color image signal CVBS; a 3.58 MHZ oscillator 2 for providing a reference sub-carrier signal fsc which is in synchronization with the burst signal; a Y/C separation unit 3 for separating Y (Luminance) and C (color) signals from the composit signal CVBS; an amplifier 4 for amplifying the C- signal from the Y/C separation unit; a color demodulator 5; a delay unit 6 for delaying the Y-signal from the Y/C separation unit 3 for a predetermined time; a matrix amplifier 7; and a phase detector 8 for detecting the phase of an amplified C-signal provided from the amplifier 4 in conjunction with the reference sub-carrier signal fsc provided from the 3.58 oscillator 2.

The color demodulator 5 comprises a tint controller "a", a R-Y demodulator "b", a 90-degree phase shifter "c", a B-Y demodulator "d", and a G-Y demodulator "e". The matrix amplifier 7 comprises mixers f, g, and h for mixing the output from the delay unit 6 and a color difference signal from the color demodulator 5, and amplifiers I, j, and k coupled thereto, respectively. The color demodulator 5 demodulates the C- signal into R-Y and B-Y demodulation signals. The user adjusts tint and color saturation in reference to the skin color produced on a display screen (e.g., color picture tube CPT).

Referring to FIG. 3, the phase detector 8 detects whether a signal representing skin color is present in the C-signal. If skin color is detected, the tint controller a of the color demodulator 5 is controlled for controlling the positioning of the demodulation axis toward the skin color axis.

However, this conventional approach has drawbacks. For example, if a color vector (e.g., $V_1$ in FIG. 2) is adjusted to move toward the skin color axis, its component value (e.g., $V_{R-Y}$) with respect to the conventional demodulation axis is reduced to another value (e.g., $V_{R-Y'}$) of a smaller magnitude, thus decreasing the overall color density. Further, the color is adjusted in reference to one skin color, incapable of responding to various kinds of skin color individually.

Another conventional approach is now explained in reference to FIG. 4. In this approach, the angle between the R-Y and the B-Y demodulation axes is fixed at 112° (not at a more conventional 90°), thus increasing the R-Y component. As shown in FIG. 5, the phase shifter "c" of the color modulator 5 in this approach is fixed at a 112°, as compared to the phase shifter of the color demodulator of FIG. 3 being fixed at a 90°. The reference numerals in FIG. 5 correspond to the same reference numerals in FIG. 3. Further, the G-Y axis (not shown) is fixed at an angle of 252°. In this approach, since the signal axis is always maintained at a same fixed angle to obtain a stable skin color, when an inputted signal represents no skin color, unnecessary color demodulation would occur.

SUMMARY OF THE INVENTION

Accordingly, it is an object of the present invention to provide a color picture quality compensation circuit which overcomes the aforementioned problems encountered in the conventional art.

To achieve the above object, a color picture quality compensation circuit of the present invention, as broadly defined and embodied herein, comprises means for detecting whether a reference color signal is present in a color signal representing a color of a video image; and means for adjusting the color picture quality of the video image in accordance with a preset value corresponding to a detected reference color signal.

According to another aspect of the present invention, a color picture quality compensation circuit comprises means for detecting whether a reference color signal is present in a color signal representing a color of a video image; means for determining a respective one of a plurality of types of reference color corresponding to a detected reference color signal; means for providing preset compensation values, each value corresponding to a respective one of the plurality of types of reference color; and means for adjusting the picture quality of the video image in accordance with one of the compensation values corresponding to the respective type of reference color.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 11 is table representing bit streams of digital data detected by the skin color type detector of FIG. 10.

FIGS. 13A, 13B, and 13C is a table of a color axis value with respect to the skin color of Mongoloid, Caucasian and Negro, respectively.

DETAILED DESCRIPTION OF THE INVENTION

Figure 6:
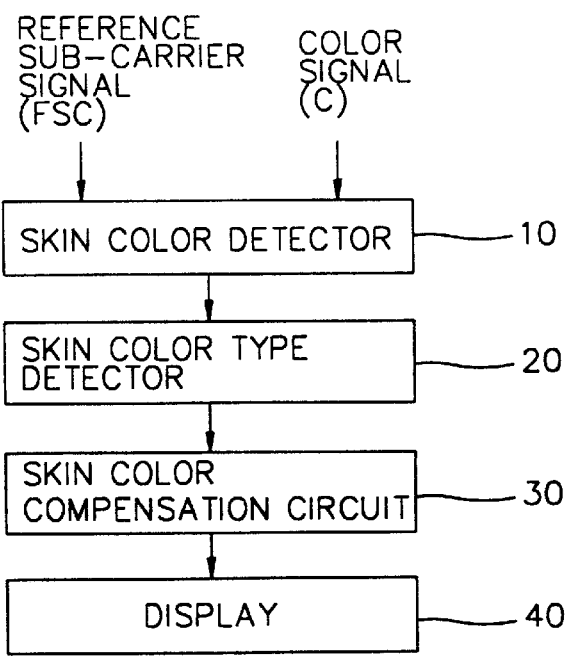
FIG. 6 is a conceptual block diagram of a color picture quality compensation circuit according to an embodiment of the present invention.

FIG. 6 is a conceptual block diagram of a color picture quality compensation circuit according to an embodiment of the present invention. In this embodiment, various different types of skin color, e.g., Mongolian, Caucasian, Negro, are used as a reference color and each type is distinguished from the other. To produce a particular type of skin color, for example, on a CPT screen, color compensation data, which represent color density, brightness, tint, etc., each corresponding to a respective one of the different types of skin color are preset, for example, in memory.

Referring to FIG. 6, the color picture quality compensation circuit of the present invention, as embodied herein, conceptually includes a skin color detector for detecting a skin color; a skin color type detector 20 for determining the type of the skin color detected by the skin color detector 10; a skin color compensation unit 30 for providing the compensation data corresponding to the type of skin color determined by the skin color type detector 20; and a display unit 40, e.g., a CPT, for displaying the color which is compensated by the compensation data.

Figure 7:
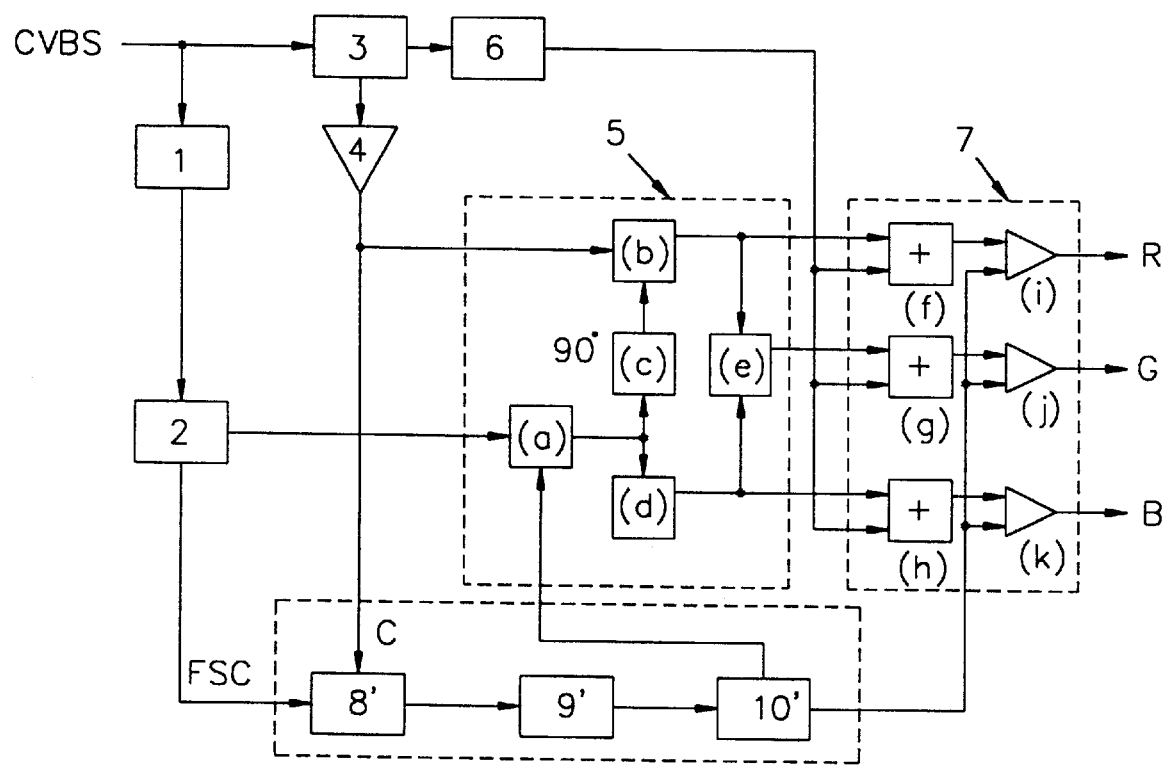
FIG. 7 is a circuit schematics of a color picture quality compensation circuit according to the embodiment of the present invention.

FIG. 7 shows a schematic of the color picture quality compensation circuit according to the embodiment of the present invention. The color compensation circuit, as embodied herein, preferably includes a phase detector 8' for detecting a skin color; a skin color type detector 9' for detecting the type of the skin color detected by the phase detector 8'; and a color compensation unit 10' for providing a compensation signal representing preset compensation data corresponding to the skin color type detected by the skin color type detector 9'. In this compensation circuit, both the skin color and the skin color type are detected in reference to the phase of the signal representing the skin color detected; and the preset compensation data representing color characteristics, e.g., color saturation, brightness corresponding to the detected type of skin color is provided; and the quality of the picture to be displayed on a screen controlled based on the detected skin color and skin color type.

Figure 1:
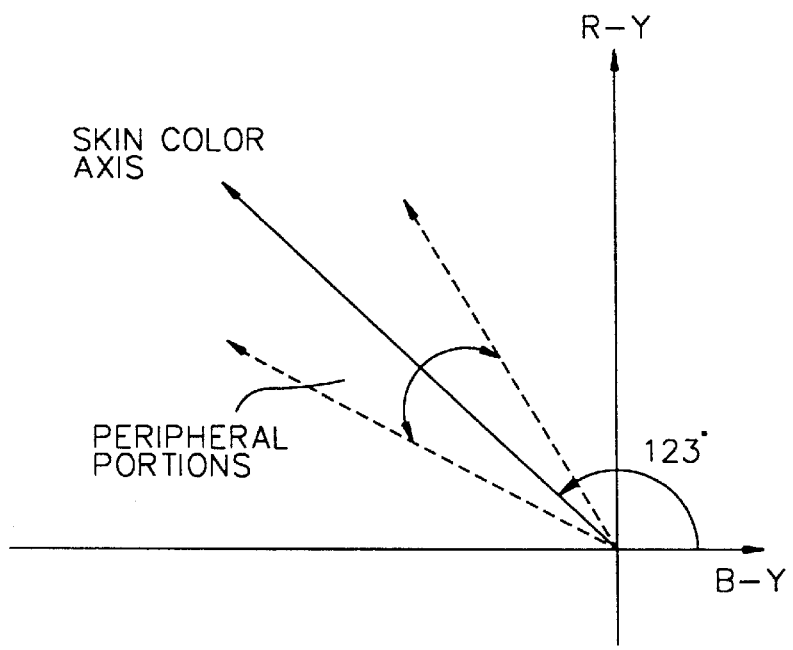
FIG. 1 is a conceptual graph representing a conventional skin color compensation approach.
Figure 2:
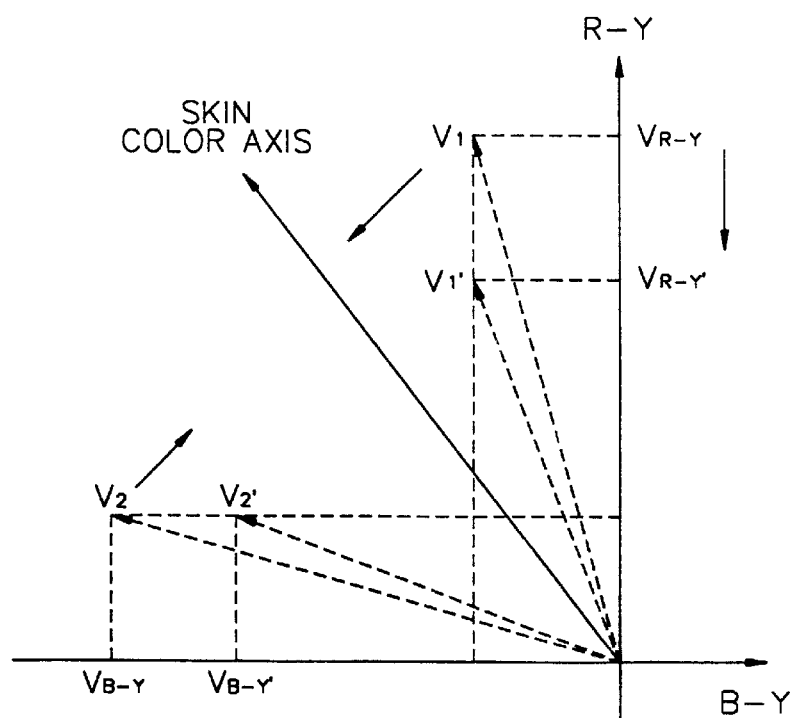
FIG. 2 is a more detailed graphical representation of FIG. 2.
Figure 3:
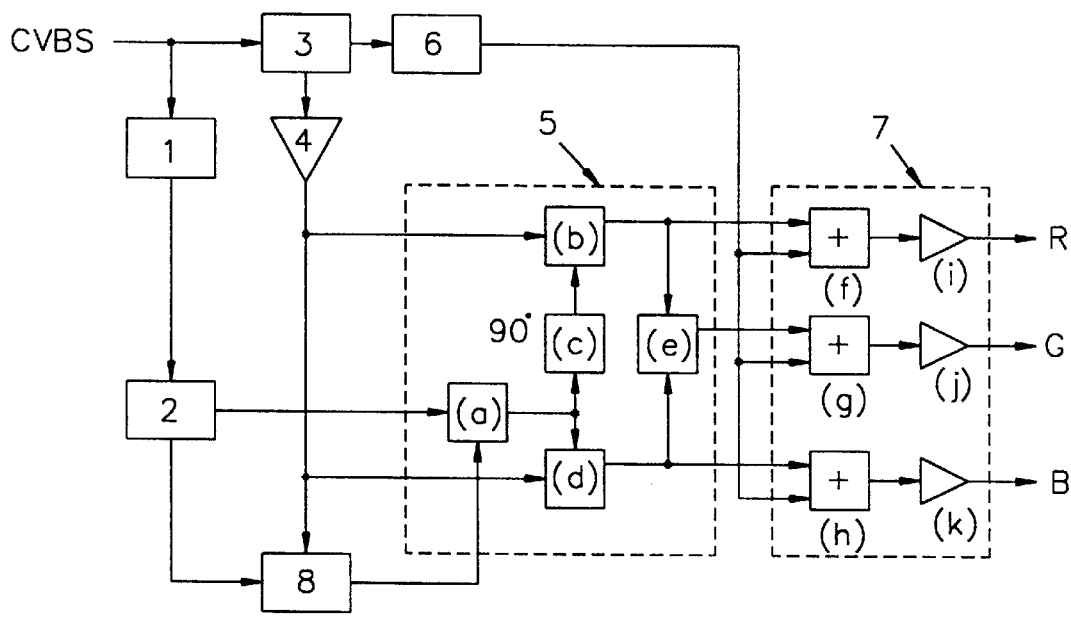
FIG. 3 is a block diagram of a conventional skin color compensation circuit.
Figure 4:
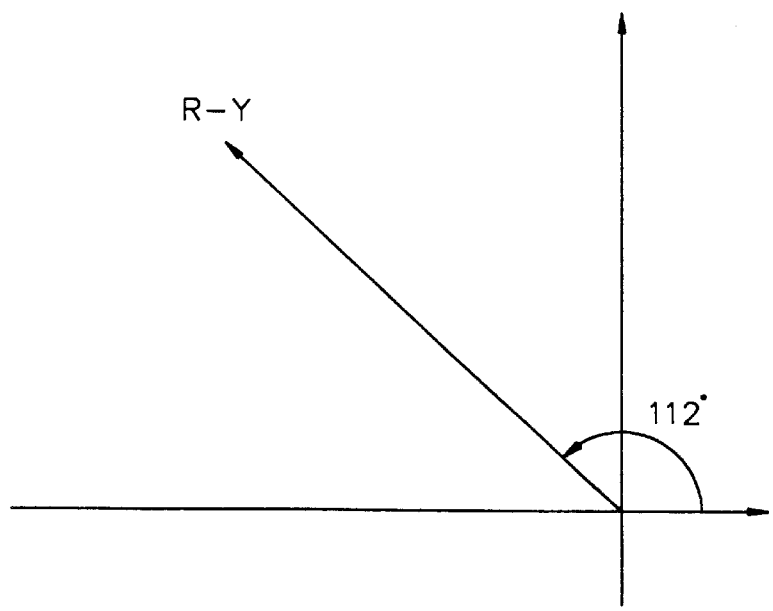
FIG. 4 is a conceptual graph representing another conventional skin color compensation approach.
Figure 5:
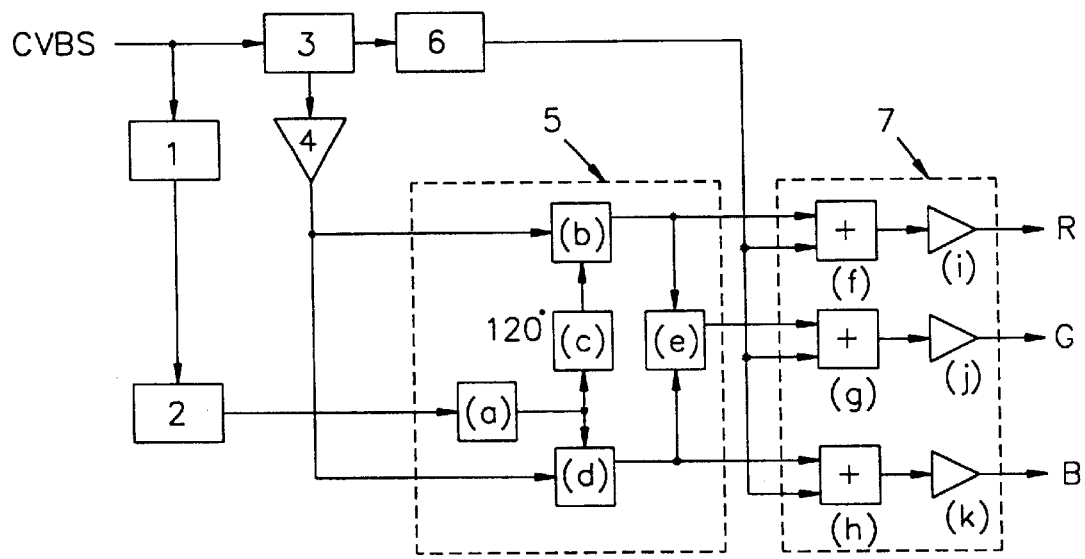
FIG. 5 is a block diagram of another conventional skin color compensation circuit.

Referring to FIG. 7, the skin type detector 9' and the color compensation unit 10' can be integrated into a microcomputer. The phase detector 8' receives the color sub-carrier signal fsc and the C-signal and determines whether skin color is present in the C-signal. Other reference numerals in FIG. 7 correspond to the same reference numerals in FIG. 3.

Figures 8, 9:
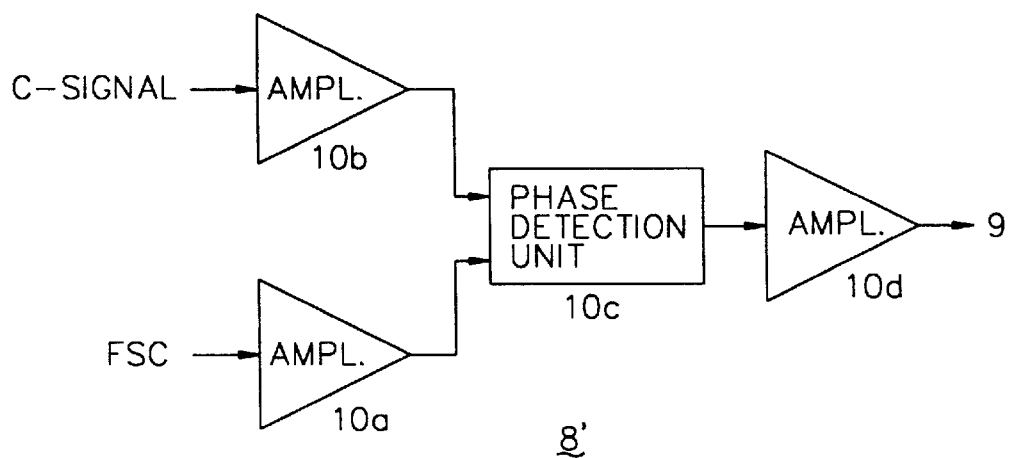
FIG. 8 is a circuit schematics of the phase detector of FIG. 7.
FIG. 9 is a table showing the phase and output voltage of the phase detector of FIG. 8 for various color bars.

FIG. 8 shows a block diagram of the phase detector 8' comprising amplifiers 10a, 10b and 10d, and a phase detection unit 10c. The phase detection unit 10c compares the phase differences between the color sub-carrier signal fsc and the C-signal, which signals have been amplified to appropriate signal levels for the phase detection unit 10c by the amplifiers 10a and 10b, respectively, and produces a voltage output representing the phase difference between these two signals to determine whether skin color is present in the C-signal. This voltage output is amplified to an appropriate signal level for the skin type detector 9' by the amplifier 10d.

FIG. 9 is a table illustrating the output voltage of the phase detector 8' of FIG. 8 for respective color bars. The "phase angle (ø)" represents the phase angle of the C-signal representing a respective color bar with respect to the demodulation axis. The output voltage of the phase detector 8' is inversely proportional to the detected phase difference. Magenta, which has a smallest phase angle with respect to the demodulation axis, has a 3.8V output. The phase detector output representing skin color varies from 2.95V to 3.25V, which correspond to a range of phase angles 116°~130° with respect to the B-Y demodulation axis, depending on the types of the skin color. According to the embodiment of the present invention, the output voltage of the phase detector 8' with respect to types of skin color is set as follows:

Type 1: Mongolian skin color: 3.0V

Type 2: Negro, sun-tanned, make-up skin color: 3.1V

Type 3: Caucasian skin color: 3.2V

Figure 10:
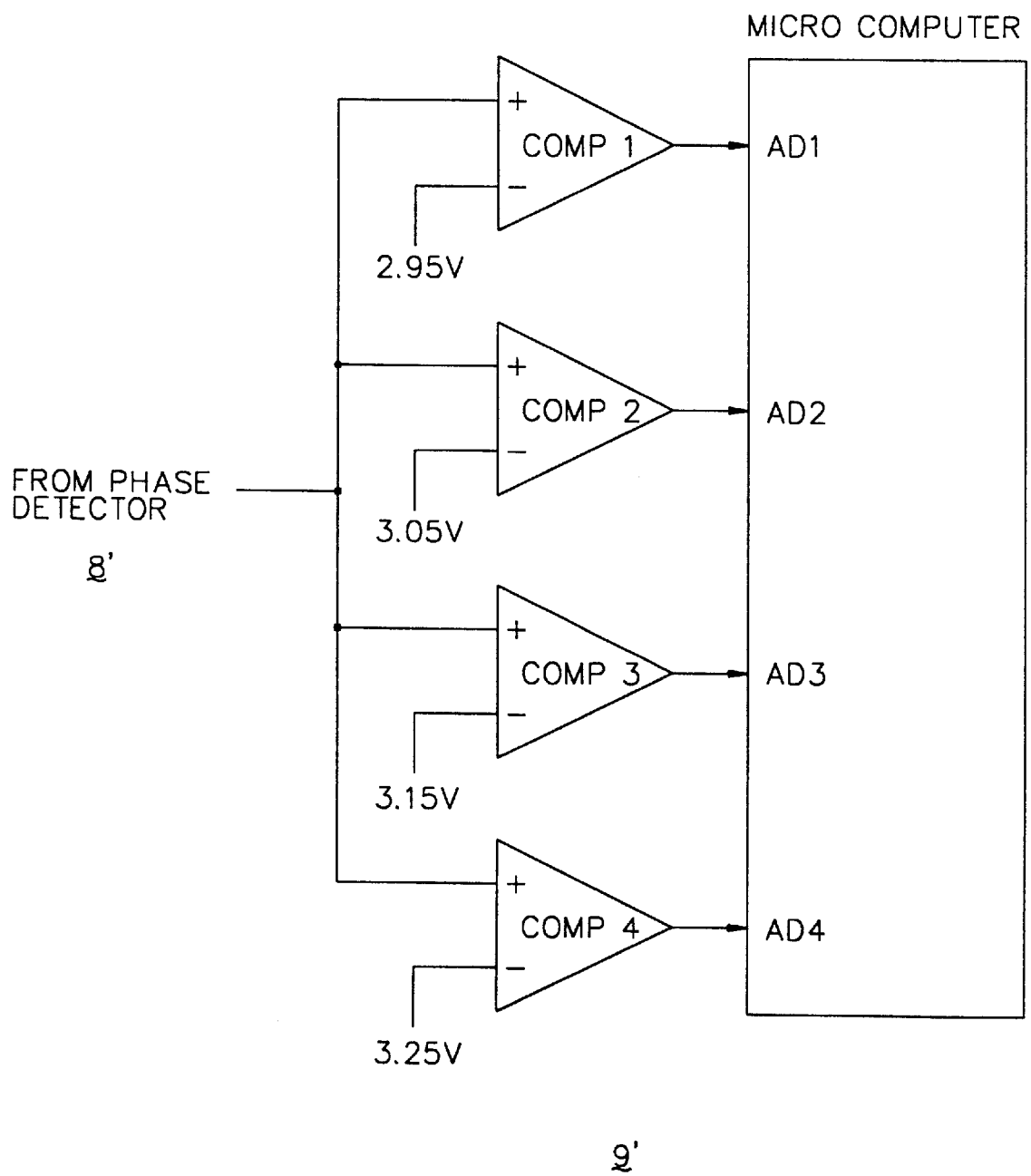
FIG. 10 is a circuit diagram of the skin color type detector of FIG. 7.

After the phase detector 8' detects the presence of skin color in the C-signal, the skin color type detector 9' determines the type of skin color corresponding to the detected skin color among the following types: Mongolian skin color; Negro, sun-tanned, make-up skin color; and Caucasian skin color. Referring to FIG. 10, in the skin color type detector 9', as embodied herein, comparators Comp1, Comp2, Comp3, and Comp4 compare the output voltage received from the phase detector 8' through non-inversion terminals (+) thereof with reference voltages 2.95V, 3.05V, 3.15V, and 3.25V applied to inversion terminals (−), respectively, and each comparator outputs a "0" or "1" value representing the result of the comparison to a respective one of analog/digital conversion terminals AD1, AD2, AD3, and AD4 of a microcomputer.

The microcomputer converts the values provided to the terminals AD1, AD2, AD3, and AD4 into a stream of four bits and determines the type of skin color based on this bit stream of digital data, and provide present compensation data corresponding to this bit stream.

For example, referring to FIG. 11, if the output values from the AD1 through AD4 are a bit stream of "1000," this represents an output voltage X of phase detector is between 2.95V and 3.05V. Then, it is determined that the type of skin color is Mongolian. Likewise, if the output values are "1100," the output voltage X is between 3.05V and 3.15V. Then, it is determined that skin color type is the make-up skin color or sun-tanned skin color or the Negro skin color. Likewise, if the output values are "1110," the output voltage X is between 3.15V and 3.25V. Then, the type of skin color is the Caucasian skin color.

Once the skin color type detector 9' determines the type of the skin color detected it provides information representing the skin color type to the skin color compensation unit 10'. The skin color compensation unit 10' reads such information every 1 msec, which corresponds to reading 15 times for one field of a picture image to ensure its accuracy. Of those information read 15 times, the information that has been repeatedly read most frequently may be considered as the true value. The skin color compensation unit 10' outputs a preset compensation value corresponding to that particular type of skin color determined by the skin color type detector, to adjust the color picture quality of the picture image.

Figure 12A:
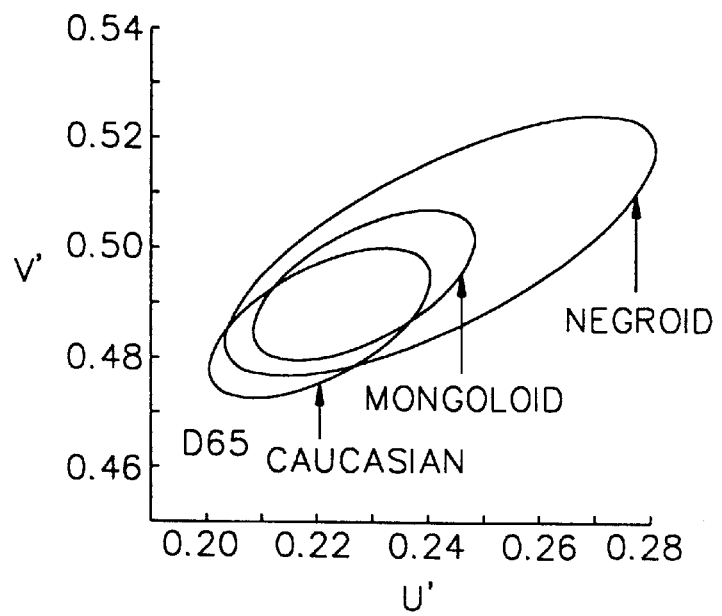
FIGS. 12A and 12B are graphs illustrating a color saturation and brightness based on different skin colors.
Figure 12B:
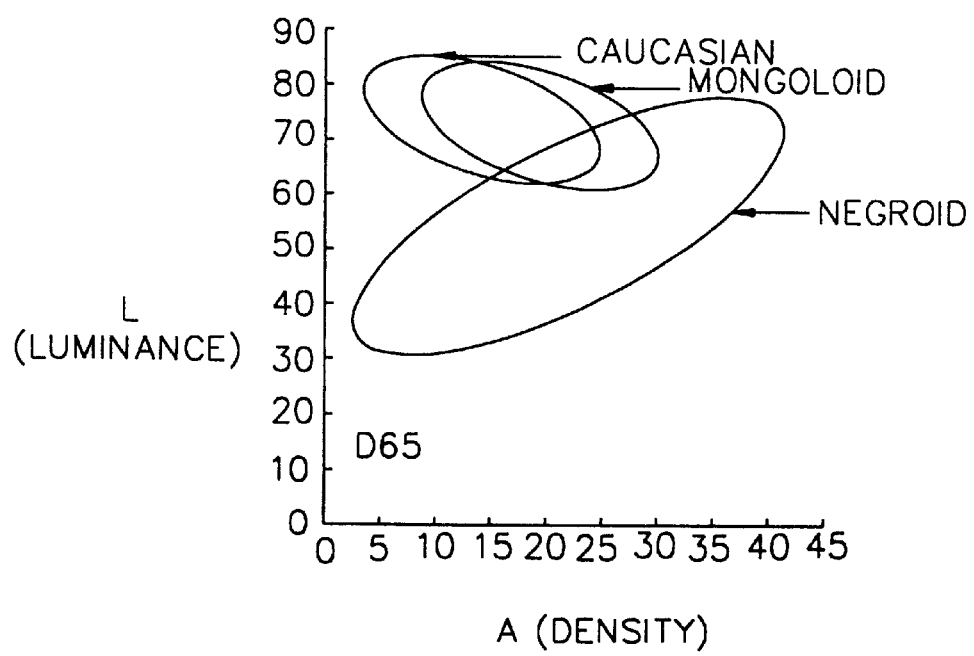

The skin color type-dependent compensation value is preset based on the following conditions. FIGS. 12A and 12B show the standard color brightness level suggested by the Commission Internatonale de Eclairage with respect to the brightness and color density of the skin color regarding Mongolian, Caucasian, and Negro skin colors. As shown in FIGS. 12A and 12B, the type of skin color can be determined based on the brightness and density of the color. For example, in FIG. 12A, the density(or saturation) of color increases in the order of Caucasian, Mongolian, and sun-tanned(or Negro). Likewise, in FIG. 12B, the brightness of color increases in the order of sun-tanned(or Negro), Mongolian, and Caucasian. Therefore, the type of skin color can be expressed in reference to the color brightness and density. Referring to FIGS. 13A, 13B, and 13C, the color axial values are measured for samples of 10 people, and the compensation values corresponding to the skin type are determined as follows.

Mongolian: brightness=55, color density=58
Sun-tanned: brightness=35, color density=65
Caucasian: brightness=65, color density=43

In summary, according to the present invention, as embodied herein, the phase detector receives the color sub-carrier signal and the C-signal of a composite video signal representing a video image and detects the phase difference between these two signals, to detect whether a signal representing skin color is present in the C-signal. If skin color is present, the type of the detected skin color, namely Mongolian skin color; Negro, sun-tanned, make-up skin color; or Caucasian skin color, is determined. Then, a preset compensation data corresponding to that particular type of skin color which represents color characteristics such as tint, color density and brightness, is provided to adjust the picture quality of the video image.

As described above, in the color picture quality compensation circuit according to the present invention, the color picture quality is adjusted in real time in reference to the type of the skin color detected from the composite video signal. If no skin color is present, no adjustments need to be made.

Although the preferred embodiments of the present invention have been disclosed for illustrative purposes, those skilled in the art will appreciate that various modifications, additions and substitutions are possible, without departing from the scope and spirit of the invention as recited in the accompanying claims. For example, according to the embodiment of the present invention described above, the skin color is used as a reference color. However, different colors (such as blue sky color, green color, etc.) can be used as a reference color. Further, rather than using a single color (e.g., skin color) as a reference color, several different colors (e.g., skin color, blue sky color, and green color) can be concurrently used as reference colors.

What is claimed is:

1. A color picture quality compensation circuit, comprising:
   a reference color detector that detects whether a reference color signal is present in a color signal representing a color of a video image;
   a reference color type detector that selects from a predetermined set comprising a plurality of reference color types to determine a particular reference color type corresponding to a detected reference color signal;
   a reference color compensation unit that provides preset compensation values, each value corresponding to a respective one of said plurality of types of reference color; and
   means for adjusting the picture quality of the video image in accordance with one of said compensation values corresponding to said particular determined reference color type.

2. A skin color compensation circuit, comprising:
   a skin color detector that detects whether a skin color signal is present in a color signal representing a color of a video image;
   a skin color type detector that selects from a predetermined set comprising a plurality of types of skin color to determine a particular skin color type corresponding to a detected skin color signal;
   a skin color compensation unit that provides preset compensation values, each value corresponding to a respective one of said plurality of types of skin color; and
   means for adjusting the picture quality of the video image in accordance with a compensation value corresponding to said particular determined skin color type.

3. The color picture quality compensation circuit of claim 1, wherein said preset compensation value is related to one or more of brightness, color saturation and tint of video image.

4. The skin color compensation circuit of claim 2, wherein said preset compensation value is related to one or more of brightness, color saturation and tint of the video image.

5. The skin color compensation circuit of claim 2, wherein said plurality of types of skin color includes one or more of Mongolian, Caucasian and Negro skin color types.

6. A color picture quality compensation circuit comprising:
   means for detecting whether a reference color signal is present in a color signal representing a color of a video image;
   means for determining a respective one of a plurality of types of reference color corresponding to a detected reference color signal;
   means for providing preset compensation values, each value corresponding to a respective one of said plurality of types of reference color; and
   means for adjusting the picture quality of the video image in accordance with one of said compensation values corresponding to said respective type of reference color,
   wherein said determining means includes means for repeatedly checking the reference color signal detected by said detecting means at a predetermined time interval and means for counting a number representing the frequency of said checking during a predetermined time period.

7. A skin color compensation circuit, comprising:

means for detecting whether a skin color signal is present in a color signal representing a color of a video image;

means for determining a respective one of a plurality of types of skin color corresponding to a detected skin color signal;

means for providing preset compensation values, each value corresponding to a respective one of said plurality of types of skin color; and means for adjusting the picture quality of the video image in accordance with a compensation value corresponding to said respective one of a plurality of types of skin color, wherein said determining means includes means for repeatedly checking the reference color signal detected by said detecting means at a predetermined time interval and means for counting a number representing the frequency of said checking during a predetermined time period.

8. The color picture compensation circuit of claim 6, wherein said determining means further comprises means for determining the respective type of reference color based on a counted number of said checking.

9. The skin color compensation circuit of claim 7, wherein said determining means further comprises means for determining the respective type of skin color based on a counted number of said checking.

10. A method for compensating color picture quality, comprising the steps of:

detecting whether a reference color signal is present in a color signal representing a color of a video image;

determining a particular reference color type corresponding to the detected reference color signal, by selecting from a predetermined set comprising a plurality of types of reference color;

providing preset compensation values, each value corresponding to a respective one of said plurality of types of reference color; and adjusting the picture quality of the video image in accordance with one of said compensation values corresponding to the determined particular reference color type.

11. A method for compensating skin color, comprising the steps of:

detecting whether a skin color signal is present in a color signal representing a color of a video image;

determining a particular skin color type, corresponding to the detected skin color signal, by selecting from a predetermined set comprising a plurality of types of skin color;

providing preset compensation values, each value corresponding to a respective one of said plurality of types of skin color; and adjusting the picture quality of the video image in accordance with a compensation value corresponding to the determined particular skin color type.

12. The color picture quality compensating method of claim 10, wherein said preset compensation value is related to one or more of brightness, color saturation and tint of the video image.

13. The skin color compensating method of claim 11, wherein said preset compensation value is related to one or more of brightness, color saturation and tint of the video image.

14. The skin color compensating method of claim 11, wherein said plurality of types of skin color includes one or more of Mongolian, Caucasian and Negro skin color types.

* * * * *